(12) United States Patent
Gu et al.

(10) Patent No.: US 8,659,486 B2
(45) Date of Patent: Feb. 25, 2014

(54) COMPUTER WITH ANTENNA

(75) Inventors: Chun-Bao Gu, Shenzhen (CN);
Wei-Wei Zhu, Shenzhen (CN);
Guang-Yun Li, Shenzhen (CN);
Wen-Hsiang Hung, Tu-Cheng (TW)

(73) Assignees: Hong Fu Jin Precision Industry (ShenZhen) Co., Ltd, Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 459 days.

(21) Appl. No.: 13/095,950

(22) Filed: Apr. 28, 2011

(65) Prior Publication Data
US 2012/0182188 A1   Jul. 19, 2012

(30) Foreign Application Priority Data
Jan. 17, 2011   (CN) .......................... 2011 1 0009211

(51) Int. Cl.
*H01Q 1/24*   (2006.01)

(52) U.S. Cl.
USPC ..................... 343/702; 343/700 MS

(58) Field of Classification Search
USPC ..................... 343/702, 700 MS, 872
See application file for complete search history.

(56) References Cited

U.S. PATENT DOCUMENTS

| | | | | |
|---|---|---|---|---|
| 6,473,043 B1 * | 10/2002 | Hwang | | 343/702 |
| 2004/0104854 A1 * | 6/2004 | Lin et al. | | 343/702 |
| 2004/0150571 A1 * | 8/2004 | Deng | | 343/702 |
| 2004/0233121 A1 * | 11/2004 | Lin et al. | | 343/906 |

* cited by examiner

*Primary Examiner* — Ahshik Kim
(74) *Attorney, Agent, or Firm* — Altis Law Group, Inc.

(57) ABSTRACT

A computer includes an enclosure, a mainboard, a main antenna, and an auxiliary antenna. The enclosure includes an inner case and an outer cover. The mainboard is received in the inner case. The main antenna and the auxiliary antenna are mounted at an outer surface of the enclosure. The main antenna and the auxiliary antenna are electrically connected to the mainboard, respectively. The outer cover is mounted on the case and covers and protects the main antenna and the auxiliary antenna.

5 Claims, 2 Drawing Sheets

COMPUTER WITH ANTENNA

BACKGROUND

1. Technical Field

The present disclosure relates to computers, and more particularly to a computer with an antenna module.

2. Description of Related Art

Many computers have wireless communication functions and may include an external antenna. Such external antennas take up space and can interfere with the placement and use of peripherals. Additionally, the exposed antennas are in danger of being damaged if struck by an object because of their inconvenient placement.

What is needed, therefore, is a computer to overcome or at least mitigate the described limitations.

BRIEF DESCRIPTION OF THE DRAWINGS

The components of the drawings are not necessarily drawn to scale, the emphasis instead being placed upon clearly illustrating the principles of the embodiments of the computer. Moreover, in the drawings, like reference numerals designate corresponding parts throughout several views.

DETAILED DESCRIPTION

Figure 1:
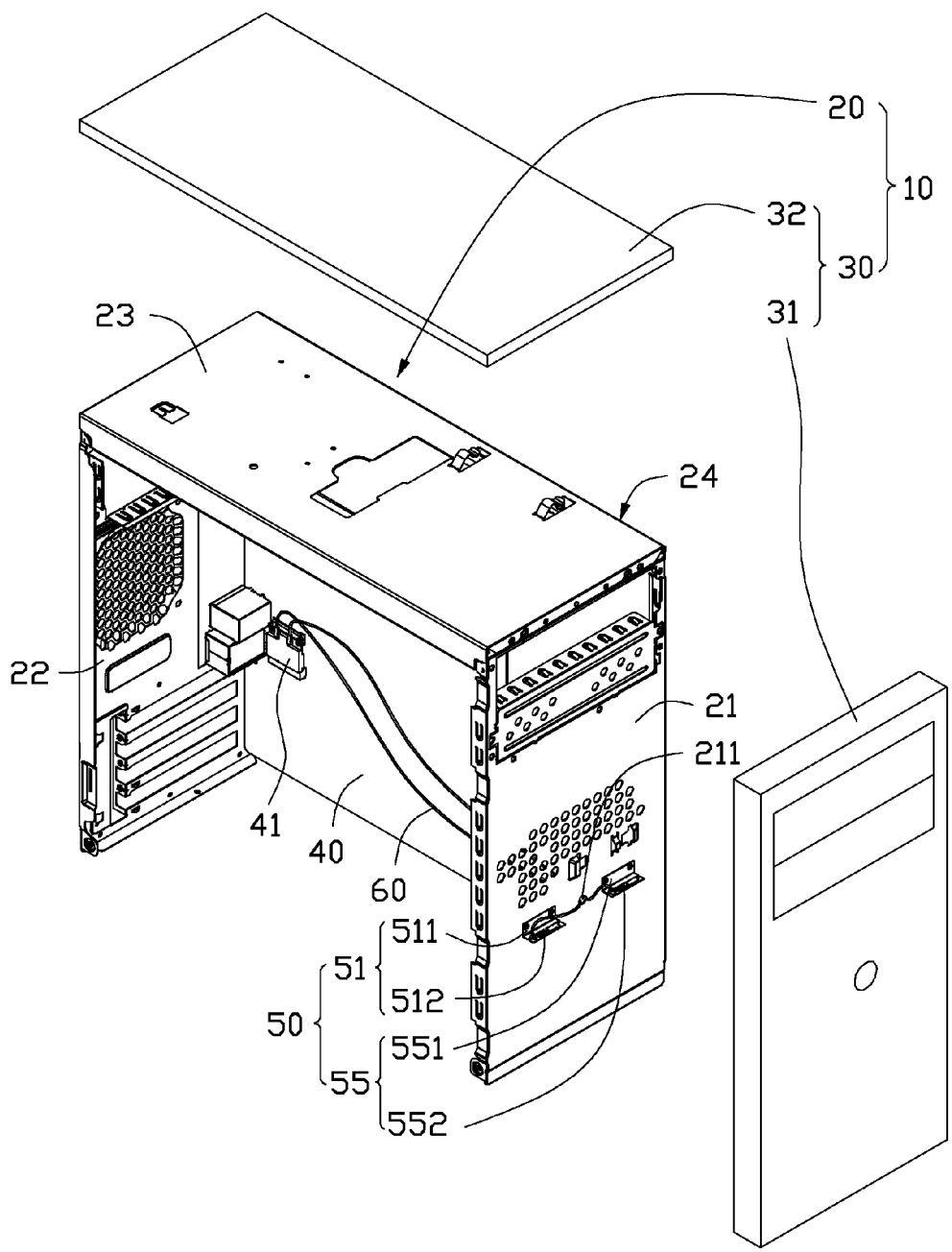
FIG. 1 is an exploded, isometric view of a computer with antennas according to a first embodiment of the present disclosure.

Referring to FIG. 1, a computer in accordance with a first embodiment of the disclosure is shown. The computer comprises an enclosure 10, a mainboard 40 received in the enclosure 10, and an antenna module 50 mounted in the enclosure 10. The enclosure 10 includes an inner case 20 and an outer cover 30 mounted at outer sides of the inner case 20.

The inner case 20 includes a top plate 23, a front panel 21 and a rear plate 22 disposed at opposite ends of the top plate 23, and two side plates 24 at opposite lateral sides of the top plate 23. The inner case 20 is formed of metal. A through hole 211 is defined in the front panel 21. The mainboard 40 is received in the inner case 20. Other components, such as a power supply unit and a hard disk, can be received in the inner case 20 and connected to the mainboard 40.

The outer cover 30 is made of plastic, and includes a front portion 31 mounted on the front panel 21 of the inner case 20 and a top portion 32 mounted on the top plate 23.

The antenna module 50 is mounted at the front panel 21 of the inner case 20. The antenna module 50 includes a main antenna 51 and an auxiliary antenna 55 mounted near the through hole 211 of the front panel 21. The main antenna 51 and auxiliary antenna 55 are metal. The main antenna 51 includes a base 511 attached on the outer surface of the front panel 21, and a signal transmitting portion 512 perpendicularly extending from the base 511. The base 511 is mounted on the front panel 21 with screws (not labeled). The signal transmitting portion 512 is used for sending and receiving signals. The auxiliary antenna 55 is similar to the main antenna 51, and includes a base 551 and a signal transmitting portion 552 perpendicularly extending from the base 551.

The mainboard 40 includes a connector 41 electrically connected to the antenna module 50 by two wires 60. The wires 60 extend through the through hole 211 of the front panel 21 and respectively connect to the main antenna 51 and the auxiliary antenna 55. In this embodiment, the antenna module 50 is sandwiched between the front portion 31 and the front panel 21.

In use of the computer, signals produced by the mainboard 40 are sent to the main antenna 51 and the auxiliary antenna 55 by the wires 60. The outer cover 30 protects the antenna module 50 from being struck and damaged. Since the outer cover 30 is made of plastic, signals transmitted by or being received by the antenna module 50 are not blocked.

Figure 2:
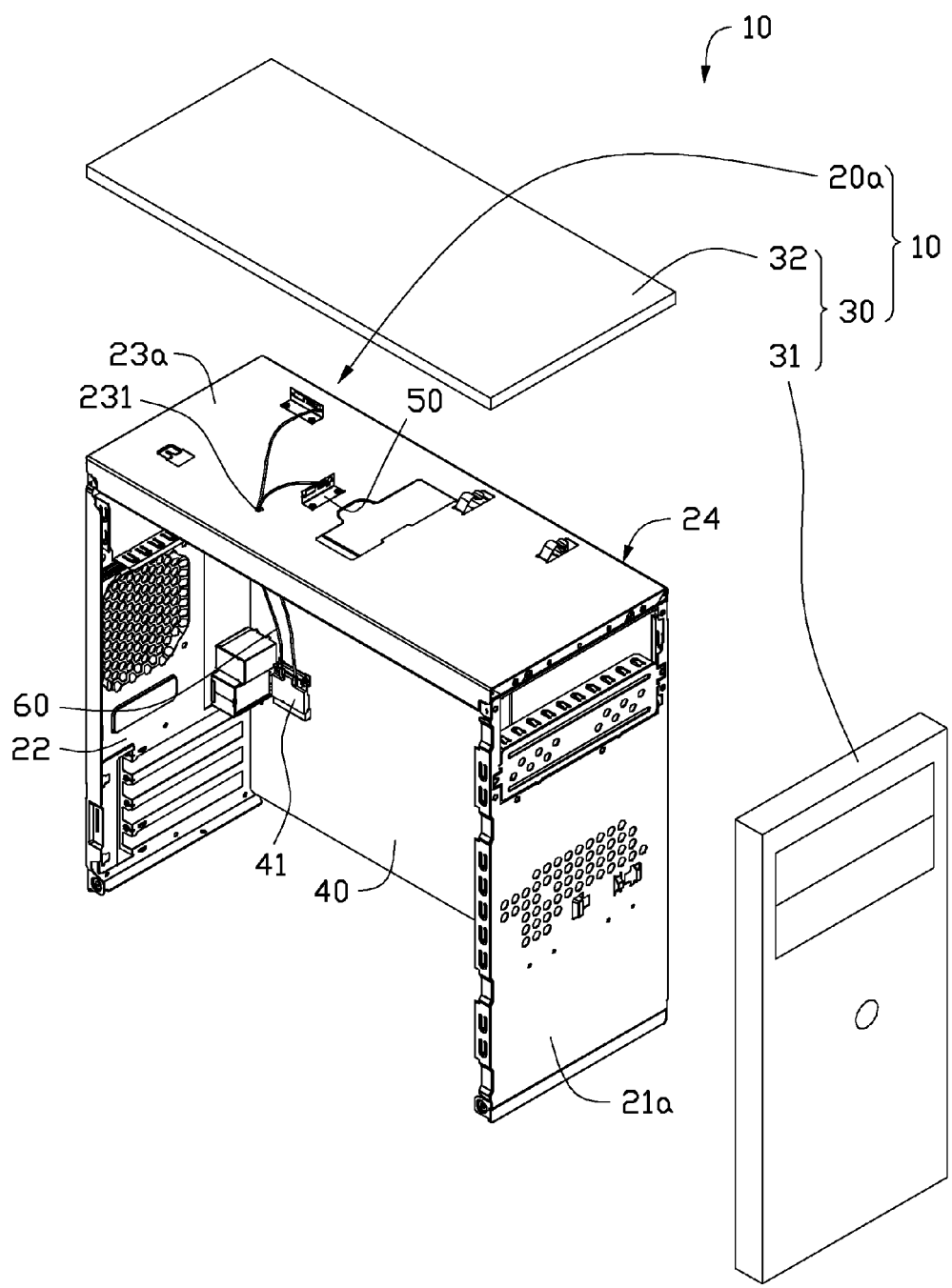
FIG. 2 is an exploded, isometric view of a computer with an antenna module according to a second embodiment of the present disclosure.

Referring to FIG. 2, a computer in accordance with a second embodiment of the disclosure is shown. Different from the computer of the first embodiment, the computer of the second embodiment includes an antenna module 50 mounted on a top plate 23a of the inner case 20a thereof. The top plate 23a defines a through hole 231 for extension of wires 60 therethrough to electrically connect the mainboard 40 to the antenna module 50. The top portion 32 of the outer cover 30 covers and protects the antenna module 50.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer comprising:
an enclosure comprising an inner case and an outer cover around the inner case;
a mainboard received in the inner case; and
an antenna module mounted at an outer surface of the inner case and covered by the outer cover, the antenna module electrically connecting the mainboard;
wherein the inner case defines a through hole, and wires extend through the through hole to interconnect the mainboard and the antenna module; and
wherein the antenna module comprises a main antenna and an auxiliary antenna mounted at opposite sides of the through hole, the wires extending through the through hole and respectively connecting the main antenna and the auxiliary antenna with the mainboard.

2. The computer of claim 1, wherein the inner case is made of metal and the outer cover is formed of plastic.

3. The computer of claim 1, wherein the main antenna and the auxiliary antenna are metal, each of the main antenna and the auxiliary antenna comprising a base mounted on the inner case and a signal transmitting portion extending out from the base, the wires electrically connecting the signal transmitting portions.

4. The computer of claim 1, wherein the inner case comprises a front panel and a top plate, and the antenna module is mounted on the top plate.

5. The computer of claim 1, wherein the inner case comprises a front panel and a top plate, and the antenna module is mounted on the front panel.

* * * * *